United States Patent
Cortez et al.

(10) Patent No.: US 10,093,847 B2
(45) Date of Patent: Oct. 9, 2018

(54) DUAL BREAKER SYSTEM FOR REDUCING FORMATION DAMAGE DURING FRACTURING

(71) Applicant: Halliburton Energy Services, Inc., Houston, TX (US)

(72) Inventors: Janette Cortez, Kingwood, TX (US); James W. Ogle, Spring, TX (US); Dipti Singh, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/026,542

(22) PCT Filed: Nov. 7, 2013

(86) PCT No.: PCT/US2013/068896
§ 371 (c)(1),
(2) Date: Mar. 31, 2016

(87) PCT Pub. No.: WO2015/069253
PCT Pub. Date: May 14, 2015

(65) Prior Publication Data
US 2016/0237336 A1 Aug. 18, 2016

(51) Int. Cl.
*E21B 43/04* (2006.01)
*C09K 8/575* (2006.01)
(Continued)

(52) U.S. Cl.
CPC .............. *C09K 8/5758* (2013.01); *C09K 8/04* (2013.01); *C09K 8/40* (2013.01); *C09K 8/508* (2013.01);
(Continued)

(58) Field of Classification Search
CPC ........ C09K 8/5758; C09K 8/62; C09K 8/572; C09K 8/5755; C09K 8/74; C09K 8/5756;
(Continued)

(56) References Cited

U.S. PATENT DOCUMENTS 5,460,226 A * 10/1995 Lawson .................. E21B 43/26
166/300
5,877,127 A * 3/1999 Card .................... C08B 37/0096
507/209
(Continued)

OTHER PUBLICATIONS

International Preliminary Report on Patentability issued in related Application No. PCT/US2013/068896, dated May 19, 2016 (8 pages).
(Continued)

*Primary Examiner* — Silvana C Runyan
(74) *Attorney, Agent, or Firm* — Craig Roddy; Baker Botts L.L.P.

(57) ABSTRACT

Methods and compositions for use in subterranean operations are disclosed comprising providing a treatment fluid that comprises a base fluid, a gelling agent, and a synergistic breaker composition, comprising: a controlled degradable acid generating material, and an oxidizing component; introducing the treatment fluid into a formation; allowing the synergistic breaker composition to substantially reduce the viscosity of the treatment fluid.

14 Claims, 5 Drawing Sheets

(51) Int. Cl.

| | | |
|---|---|---|
| C09K 8/04 | (2006.01) | |
| C09K 8/40 | (2006.01) | |
| C09K 8/508 | (2006.01) | |
| C09K 8/512 | (2006.01) | |
| C09K 8/514 | (2006.01) | |
| C09K 8/524 | (2006.01) | |
| C09K 8/60 | (2006.01) | |
| C09K 8/68 | (2006.01) | |
| C09K 8/74 | (2006.01) | |
| C09K 8/88 | (2006.01) | |
| C09K 8/90 | (2006.01) | |
| C09K 8/57 | (2006.01) | |
| C09K 8/62 | (2006.01) | |
| E21B 43/26 | (2006.01) | |
| E21B 43/267 | (2006.01) | |

(52) U.S. Cl.
CPC .............. *C09K 8/512* (2013.01); *C09K 8/514* (2013.01); *C09K 8/524* (2013.01); *C09K 8/572* (2013.01); *C09K 8/5751* (2013.01); *C09K 8/5755* (2013.01); *C09K 8/5756* (2013.01); *C09K 8/601* (2013.01); *C09K 8/62* (2013.01); *C09K 8/68* (2013.01); *C09K 8/685* (2013.01); *C09K 8/74* (2013.01); *C09K 8/88* (2013.01); *C09K 8/887* (2013.01); *C09K 8/90* (2013.01); *E21B 43/26* (2013.01); *E21B 43/267* (2013.01); *C09K 2208/20* (2013.01); *C09K 2208/26* (2013.01); *E21B 43/04* (2013.01)

(58) Field of Classification Search
CPC . C09K 8/04; C09K 8/601; C09K 8/68; C09K 8/887; C09K 8/508; C09K 8/90; C09K 8/512; C09K 8/524; C09K 8/5751; C09K 8/40; E21B 43/267; E21B 43/26; E21B 43/04
See application file for complete search history.

(56) References Cited

U.S. PATENT DOCUMENTS

| | | | |
|---|---|---|---|
| 7,219,731 B2* | 5/2007 | Sullivan | C09K 8/506 166/278 |
| 8,163,826 B2 | 4/2012 | Willberg et al. | |
| 8,387,696 B2 | 3/2013 | Prasek et al. | |
| 2003/0008779 A1* | 1/2003 | Chen | A61K 8/8158 507/200 |
| 2006/0172893 A1* | 8/2006 | Todd | C09K 8/10 507/203 |
| 2006/0254774 A1* | 11/2006 | Saini | B01F 17/0028 166/300 |
| 2008/0078549 A1 | 4/2008 | Moorehead et al. | |
| 2008/0139415 A1* | 6/2008 | Todd | C09K 8/506 507/241 |
| 2008/0217011 A1 | 9/2008 | Pauls et al. | |
| 2009/0247430 A1 | 10/2009 | Fu | |
| 2010/0099587 A1 | 4/2010 | Welton et al. | |
| 2010/0270017 A1 | 10/2010 | Prasek et al. | |
| 2012/0241158 A1 | 9/2012 | Seshadri et al. | |
| 2015/0000910 A1* | 1/2015 | Russell | E21B 43/267 166/280.1 |

OTHER PUBLICATIONS

International Search Report issued in related PCT Application No. PCT/US2013/068896 dated Aug. 18, 2014, 3 pages.

Cox, P. A. Instant notes: inorganic chemistry. New York: BIOS/ Springer, 2000.

Dawson, J. C. "A Thermodynamic Study of Borate Complexation with Guar and Guar Derivatives." In SPE Annual Technical Conference and Exhibition. Society of Petroleum Engineers, 1991.

Al Mubarak, Tariq, Mohammed AlKhaldi, and Abdulaziz AlGhamdi. "Design and Application of High Temperature Seawater Based Fracturing Fluids in Saudi Arabia." In Offshore Technology Conference Asia. Offshore Technology Conference, 2016.

* cited by examiner

Regain Perm

| Fluid Recipe |
|---|
| 40lb/Mgal CMHEC in ATSM Seawater fortified with 3%KCl |
| 1.0gpt CL-41 |
| 10gpt SP Breaker |
| 10ppt PLA |

| | | |
|---|---|---|
| Initial Permeability | 118.069 | mD |
| Final Permeability | 76.14794 | mD |
| Regained Permeability | 64.5 | % |

DUAL BREAKER SYSTEM FOR REDUCING FORMATION DAMAGE DURING FRACTURING

CROSS-REFERENCE TO RELATED APPLICATION

The present application is a U.S. National Stage Application of International Application No. PCT/US2013/068896 filed Nov. 7, 2013, which is incorporated herein by reference in its entirety for all purposes.

BACKGROUND

The present disclosure relates to methods and compositions for use in subterranean operations. More particularly, the present disclosure relates to methods of reducing the viscosity of subterranean treatment fluids.

Well services can include various types of treatments that are commonly performed in a wellbore or subterranean formation. As used herein, the word "treatment" refers to any treatment for changing a condition of a portion of a wellbore or an adjacent subterranean formation; however, the word "treatment" does not necessarily imply any particular treatment purpose.

Treatment fluids may be used in a variety of subterranean treatments, including, but not limited to, stimulation treatments and sand control treatments. One common production stimulation operation that employs a treatment fluid is hydraulic fracturing. Hydraulic fracturing operations generally involve pumping a treatment fluid (e.g., a fracturing fluid) into a well bore that penetrates a subterranean formation at a sufficient hydraulic pressure to create or enhance one or more cracks, or "fractures," in the subterranean formation. The fracturing fluid may comprise particulates, often referred to as "proppant," that are deposited in the fractures. The proppant particulates, inter alia, prevent the fractures from fully closing upon the release of hydraulic pressure, forming conductive channels through which fluids may flow to the well bore. Once at least one fracture is created and the proppant particulates are substantially in place, the fracturing fluid may be "broken" (i.e., the viscosity is reduced), and the fracturing fluid may be recovered from the formation.

Maintaining sufficient viscosity in these treatment fluids is important for a number of reasons. Maintaining sufficient viscosity is important in fracturing and sand control treatments for particulate transport and/or to create or enhance fracture width. Also, maintaining sufficient viscosity may be important to control and/or reduce fluid-loss into the formation. Moreover, a treatment fluid of a sufficient viscosity may be used to divert the flow of fluids present within a subterranean formation (e.g., formation fluids, other treatment fluids) to other portions of the formation, for example, by "plugging" an open space within the formation. At the same time, while maintaining sufficient viscosity of the treatment fluid often is desirable, it also may be desirable to maintain the viscosity of the treatment fluid in such a way that the viscosity may be reduced at a particular time, inter alia, for subsequent recovery of the fluid from the formation.

To provide the desired viscosity, polymeric gelling agents may be added to the treatment fluids. Examples of commonly used polymeric gelling agents include, but are not limited to, guar gums and derivatives thereof, cellulose derivatives, biopolymers, polysaccharides, synthetic polymers, and the like. To further increase the viscosity of a treatment fluid, often the molecules of the gelling agent are "crosslinked" with the use of a crosslinking agent. Conventional crosslinking agents usually comprise a metal ion that interacts with at least two polymer molecules to form a "crosslink" between them.

At some point in time, e.g., after a viscosified treatment fluid has performed its desired function, the viscosity of the viscosified treatment fluid should be reduced. This is often referred to as "breaking the gel" or "breaking the fluid." This can occur by, inter alia, reversing the crosslink between crosslinked polymer molecules, breaking down the molecules of the polymeric gelling agent, or breaking the crosslinks between polymer molecules. The use of the term "break" herein incorporates at least all of these mechanisms. Certain breakers that are capable of breaking treatment fluids comprising crosslinked gelling agents are known in art. For example, breakers comprising sodium bromate, sodium chlorite, and other oxidizing agents have been used to reduce the viscosity of treatment fluids comprising crosslinked polymers. Examples of such breakers are described in U.S. Pat. No. 5,759,964 to Shuchart, et al., and U.S. Pat. No. 5,413,178 to Walker, et al., the relevant disclosures of which are herein incorporated by reference.

After completion of a hydraulic fracturing operation on a well, residual fracturing fluid left over in the fracture may reduce the permeability of the well formation, thereby also decreasing the production efficiency of the well. Thus, before a well that has undergone hydraulic fracturing begins production, the fracturing fluid is typically treated to increase formation permeability. In order to reduce the negative effect of fracturing fluid, oxidizers such as sodium persulfate (SP), ammonium persulfate, coated breakers, enzyme breakers, and delayed acid generators have been used to reduce the viscosity of the fracturing fluid and cause an increase in formation permeability.

In addition, residual fracturing fluid may cause damage to a well formation after a hydraulic fracturing operation is completed. Removal of the fracturing fluid allows greater control and protection of formation integrity. Greater stability of the formation lowers the risk that shifts or changes in the formation will cause some disruption to production or damage to equipment. Thus, efficient clean-up of the fracturing fluid generates an added benefit to production efficiency.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates to methods and compositions for use in subterranean operations. More particularly, the present disclosure relates to methods of reducing the viscosity of subterranean treatment fluids.

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The treatment fluids of the present disclosure generally comprise an aqueous base fluid, a gelling agent, and a synergistic breaker composition. In certain embodiments, the gelling agent may comprise a "crosslinked gelling agent," which is defined herein to mean that at least a portion of the gelling agent may be crosslinked by a crosslinking reaction comprising a crosslinking agent.

The aqueous base fluid used in the treatment fluids of the present disclosure may comprise any water-based fluid, including, but not limited to, seawater, produced water, formation water, salt-fortified fresh water, fresh water, salt-fortified sea water, heavy brine solutions, or combinations thereof. Generally, the water may be from any source, provided that it does not contain components that might adversely affect the stability and/or performance of the treatment fluids of the present disclosure. In certain embodiments, the density of the aqueous base fluid can be increased, among other purposes, to provide additional particle transport and suspension in the treatment fluids of the present disclosure.

The gelling agents utilized in the present disclosure may comprise any polymeric material capable of increasing the viscosity of an aqueous fluid. In certain embodiments, the gelling agent may comprise polymers that have at least two molecules that are capable of forming a crosslink in a crosslinking reaction in the presence of a crosslinking agent, and/or polymers that have at least two molecules that are so crosslinked (i.e., a crosslinked gelling agent). The gelling agents may be naturally-occurring, synthetic, or a combination thereof. In certain embodiments, suitable gelling agents may comprise polysaccharides, and derivatives thereof that contain one or more of these monosaccharide units: galactose, mannose, glucoside, glucose, xylose, arabinose, fructose, glucuronic acid, or pyranosyl sulfate. Examples of suitable polysaccharides include, but are not limited to, polyacrylamides; hydrolyzed polyacrylamides; xanthan; scleroglucan; cellulose polysaccharides; amphoteric polymers made from acrylamide, acrylic acid, and diallyldimethylammonium chloride; vinyl sulfonate/vinyl amide/acrylamide terpolymers; vinyl sulfonate/acrylamide copolymers; acrylamide/acrylamido-methylpropanesulfonic acid copolymers; acrylamide/vinylpyrrolidone copolymers; sodium carboxymethyl cellulose; poly[dialkylaminoacrylate-co-acrylate-graft-poly(ethyleneoxide)]; acrylamide/octadecyldimethylammoniumethyl methacrylate bromide copolymer; dimethylaminoethyl methacrylate/vinyl pyrrolidone/hexadecyldimethylammoniumethyl methacrylate bromide terpolymer; acrylamide/2-acrylamido-2-methyl propane sulfonic acid/2-ethylhexyl methacrylate terpolymer; and combinations thereof.

The gelling agent may be present in the treatment fluids of the present disclosure in an amount sufficient to provide the desired viscosity. In some embodiments, the gelling agents may be present in an amount in the range of from about 0.12% to about 2.0% by weight of the treatment fluid. In certain embodiments, the gelling agents may be present in an amount in the range of from about 0.18% to about 0.72% by weight of the treatment fluid.

In those embodiments of the present disclosure wherein it is desirable to crosslink the gelling agent, the treatment fluid may comprise one or more of the crosslinking agents. The crosslinking agents may comprise a metal ion that is capable of crosslinking at least two molecules of the gelling agent. Examples of suitable crosslinking agents include, but are not limited to, borate ions, zirconium IV ions, titanium IV ions, aluminum ions, antimony ions, chromium ions, iron ions, copper ions, and zinc ions. These ions may be provided by providing any compound that is capable of producing one or more of these ions; examples of such compounds include, but are not limited to, boric acid, disodium octaborate tetrahydrate, sodium diborate, pentaborates, ulexite, colemanite, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds, and combinations thereof. In certain embodiments of the present disclosure, the crosslinking agent may be formulated to remain inactive until it is "activated" by, among other things, certain conditions in the fluid (e.g., pH, temperature, etc.) and/or contact with some other substance. In some embodiments, the crosslinking agent may be delayed by encapsulation with a coating (e.g., a porous coating through which the breaker may diffuse slowly, or a degradable coating that degrades downhole) that delays the release of the crosslinking agent until a desired time or place. The choice of a particular crosslinking agent will be governed by several considerations that will be recognized by one skilled in the art with the benefit of the present disclosure, including but not limited to the following: the type of gelling agent included, the molecular weight of the gelling agent(s), the pH of the treatment fluid, temperature, and/or the desired time for the crosslinking agent to crosslink the gelling agent molecules.

When included, suitable crosslinking agents may be present in the treatment fluids of the present disclosure in an amount sufficient to provide, inter alia, the desired degree of crosslinking between molecules of the gelling agent. In certain embodiments, the crosslinking agent may be present in the treatment fluids of the present disclosure in an amount in the range of from about 0.0005% to about 0.2% by weight of the treatment fluid. In certain embodiments, the crosslinking agent may be present in the treatment fluids of the present disclosure in an amount in the range of from about 0.001% to about 0.05% by weight of the treatment fluid. One of ordinary skill in the art, with the benefit of this disclosure, will recognize the appropriate amount of crosslinking agent to include in a treatment fluid of the present disclosure based on, among other things, the temperature conditions of a particular application, the type of gelling agents used, the molecular weight of the gelling agents, the desired degree of viscosification, and/or the pH of the treatment fluid.

The treatment fluids used in the present disclosure optionally may comprise any number of additional additives, including, but not limited to, salts, surfactants, acids, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, dispersants, flocculants, additional $H_2S$ scavengers, $CO_2$ scavengers, oxygen scavengers, lubricants, viscosifiers, breakers, weighting agents, relative permeability modifiers, resins, particulate materials (e.g., proppant particulates), wetting agents, coating enhancement agents, and the like. A person skilled in the art, with the benefit of this disclosure, will recognize the types of additives that may be included in the fluids of the present disclosure for a particular application.

The additives of the present disclosure may be used in conjunction with any fluid, which may include, but are not limited to, treatment fluids introduced into a subterranean formation as well as fluids found in a subterranean formation (e.g., formation water, hydrocarbon fluids, etc.) and/or any combination thereof. The treatment fluids and formation fluids in the present disclosure generally comprise a base liquid, which may comprise any liquid known in the art, such as aqueous liquids, non-aqueous liquids, or any mixture thereof Where the base liquid comprises an aqueous liquid, it may comprise fresh water, salt water (e.g., water containing one or more salts dissolved therein), brine (e.g., saturated salt water), or seawater. Generally, the water can be from any source, provided that it does not contain compounds that adversely affect other components of the fluid. Where the base liquid comprises a non-aqueous liquid, it may comprise any number of organic liquids. Examples of suitable organic liquids include, but are not limited to, mineral oils, synthetic oils, esters, and the like. In certain embodiments, the treatment fluids and/or formation fluids in the present disclosure may comprise emulsions (including invert emulsions), suspensions, gels, foams, or other mixtures of liquids with solids and/or gases.

The methods, fluids, and/or additives of the present disclosure may be used during or in conjunction with any subterranean operation wherein a fluid is used or treated. In certain embodiments, the methods, fluids, and/or additives of the present disclosure may be used in the course of drilling operations. In these embodiments, the methods, fluids, and/or additives of the present disclosure may be used to reduce or eliminate concentrations of $H_2S$ from a drilling fluid used in drilling a well or borehole, for example, in a hydrocarbon-bearing subterranean formation where $H_2S$ is often encountered. Other suitable subterranean operations may include, but are not limited to, preflush treatments, afterflush treatments, hydraulic fracturing treatments, sand control treatments (e.g., gravel packing), acidizing treatments (e.g., matrix acidizing or fracture acidizing), "frac-pack" treatments, well bore clean-out treatments, and other operations where a treatment fluid may be useful. Such treatment fluids may include, but are not limited to, drilling fluids, preflush fluids, afterflush fluids, fracturing fluids, acidizing fluids, gravel packing fluids, packer fluids, spacer fluids, and the like.

The treatment fluid may be provided and introduced into the subterranean formation in certain embodiments of the present disclosure by any means known in the art. The treatment fluid may be prepared at the job site, or certain components of the treatment fluid (e.g., the aqueous base fluid and the gelling agent) may be pre-mixed several hours prior to use and then transported to the job site. Certain components of the treatment fluid may be provided as a "dry mix" to be combined with the aqueous base fluid and/or other components prior to or during introducing the treatment fluid into the subterranean formation. In certain embodiments, the treatment fluid may be introduced into the subterranean formation by pumping the treatment fluid into a well bore that penetrates a portion of the subterranean formation. In certain embodiments (e.g., fracturing operations), the treatment fluid may be introduced into the subterranean formation at or above a pressure sufficient to create or enhance one or more fractures in a portion of the subterranean formation. In certain embodiments, the treatment fluid may comprise a plurality of particulates (e.g., sand, gravel, bauxite, ceramic materials, glass materials, polymer materials, wood, fibrous materials, and/or composite particulates), which may be used, inter alia, to prop open one or more fractures in the subterranean formation and/or to form a gravel pack in or adjacent to a portion of the subterranean formation.

The synergistic breaker composition of the present disclosure may comprise an oxidizer component and a controlled degradable acid generating component.

In certain embodiments, the controlled degradable acid generating component may be polylactic acid (PLA) having a molecular formula $(C_3H_4O_2)_n$. In certain embodiments, the oxidizing component may be sodium persulfate (SP), molecular formula $Na_2S_2O_8$. The present disclosure uses PLA and SP as examples of controlled degradable acid generating material and oxidizer, respectively, and does not intend to limit the oxidizer used in the composition to SP; any oxidizer suitable for use in breaking base fracturing fluids may be used.

Further, certain embodiments of the synergistic breaker composition may include a controlled degradable acid generating material similar to PLA. For example, the controlled degradable acid generating material may comprise esters; ortho esters; poly(ortho esters); aliphatic polyesters; lactides; poly(lactides); glycolides; poly(glycolides); lactones; poly(s-caprolactones); poly(hydroxybutyrates); anhydrides; poly(anhydrides); poly(amino acids); and copolymers; and derivatives and combinations thereof In certain embodiments, the controlled degradable acid generating material may be foamed. In certain embodiments, the controlled degradable acid generating material may be mixed with other materials, such as inorganic salts; surfactants; emulsions of water and oil; clay materials such as laponite, kaolinite, and montmorillonite; and/or organic materials such as benzoic acid, and similar solid materials that phase change at desired operation temperatures.

In certain embodiments, the controlled degradable acid generating material may be any material that degrades to a corresponding carboxylic acid in the treatment fluid over a course of time required by the operation. In certain embodiments, the controlled degradable acid generating material may degrade by about 20% to its corresponding carboxylic acid in no faster than about one hour. In certain embodiments, the controlled degradable acid generating material may degrade by about 80% to its corresponding carboxylic acid in no faster than about four hours. In certain embodiments, the controlled degradable acid generating material may degrade by about 95% to its corresponding carboxylic acid in no slower than about 30 days. For example, in certain embodiments, PLA may degrade by about 80% to lactic acid, its corresponding carboxylic acid, in about 48 hours.

The particular ratio of controlled degradable acid generating material and oxidizer in the synergistic breaker composition may be determined by using a fluid rheology break test. In certain embodiments, the ratio of controlled degradable acid generating material and oxidizer and/or amounts of controlled degradable acid generating material and oxidizer in the synergistic breaker composition may be adjusted to provide a desired break profile for the fluid. The break profile of the fluid may allow the fluid to remain stable at bottom hole temperatures and delay breaking until the fracture closes.

The breaker should be present in the treatment fluids of the present disclosure in an amount sufficient to provide the desired viscosity reduction. In certain embodiments, the breaker may be may be present in the treatment fluids of the present disclosure such that the concentration of the controlled degradable acid generating component is in the range of from about 0.01 ppt to about 25 ppt. In certain embodiments, the breaker may be may be present in the treatment fluids of the present disclosure such that the concentration of the oxidizer component is in the range of from about 0.01 ppt to about 40 ppt. In certain embodiments, the synergistic breaker composition may be comprised of about 0.1 to about 10 ppt degradable acid component. In certain embodiments, the synergistic breaker composition may be comprised of about 0.1 to about 4 ppt oxidizer component.

The breaker may be allowed to at least partially reduce the viscosity of the treatment fluid at any point in the course of the treatment, for example, at the conclusion of a particular treatment of a subterranean formation in order to facilitate recovery of the fluid from the formation. In certain embodiments, the viscosity of the treatment fluid may be reduced and the treatment fluid may be recovered so as to deposit particulates therein in at least a portion of the subterranean formation and/or one or more fractures therein. The synergistic breaker composition may be added to a treatment fluid at any point in time before, during, or after an operation using the treatment fluid. The synergistic breaker composition may be added to a treatment fluid at the surface before the treatment fluid is introduced into a well bore, or it may be added to the treatment fluid after some portion of the fluid is already present in the well bore. In some embodiments, the synergistic breaker composition may be delayed by encapsulation with a coating (e.g., a porous coating through which the breaker may diffuse slowly, or a degradable coating that degrades down hole) that delays the release of the breaker until a desired time or place.

When used in combination according to the present disclosure, the oxidizer component and the controlled degradable acid generating material create an unexpectedly greater improvement to regained formation permeability after treatment fluid cleanup than the simple addition of the respective effects of each component. Without intending to be bound by theory, it is believed that when the oxidizer component and the controlled degradable acid generating component are present the synergistic breaker composition may operate by generating a free radical that may initiate both breaking of the treatment fluid and the controlled degradable acid generatingcomponent. Breaking of the controlled degradable acid generating component may generate lactic acid, which may aid in breaking and cleaning up the treatment fluid. Further, the oxidizer may operate to de-crosslink the treated fluid into long polymer chains to create a linear fluid. The controlled degradable acid generating component may then break the polymer chains into single or individual monomers, aiding in the cleanup of the treated fluid.

The methods and compositions disclosed in the present disclosure may provide a breaker composition that exhibits greater control of the treatment fluid break curve during downhole operations and greater regained permeability of a treated formation after the treatment fluid has been cleaned up. Use of the synergistic breaker composition as described in the present disclosure may increase the formation permeability following cleanup of the treatment fluid to a range of about 10 µD to about 20 D. In certain embodiments, the formation permeability may be increased to a range of about 100 mD to about 2 D following cleanup of the treatment fluid.

The methods of the present disclosure may be used in any subterranean operation involving the introduction of a treatment fluid into a subterranean formation wherein the viscosity of the treatment fluid is reduced, including, but not limited to, fracturing operations, gravel-packing operations, frac-packing operations, well bore cleanout operations, leak-off prevention during drilling, diversion, and the like. In certain embodiments of the present disclosure, the treatment fluid may be introduced into a portion of a subterranean formation so as to create a "plug" capable of diverting the flow of fluids present within the subterranean formation (e.g., formation fluids, other treatment fluids) to other portions of the formation. In those embodiments, the breaker then may be allowed to reduce the viscosity of the fluid forming the "plug," which may at least partially restore the flow of fluids through that portion of the subterranean formation.

Concentrations of PLA and SP used in the synergistic breaker composition may be adjusted to obtain a suitable break profile of the fluid for the formation and particular fracturing operation. Mini-fracture analysis may be used to determine the fracture closure time. The fracture closure time being the time a fracture takes to close after the fracture is propagated. The fluid used in the operation may be treated with the synergistic breaker composition to obtain a breaking profile wherein, at bottom hole temperature, the fluid does not break prior to fracture closure, and instead breaks after fracture closure.

In one embodiment, the present disclosure is directed to a synergistic breaker composition for breaking and cleaning up fracturing fluid from a well after completion of a fracturing operation. One possible benefit of this system is that it may allow greater permeability of the fractured formation and allow more efficient production of the fractured well. Another potential advantage of this composition is that it may allow greater clean up and removal of fracturing fluids from the formation, further reducing any environmental impact.

A method according to certain embodiments may include providing a treatment fluid that comprises a base fluid, a gelling agent, and a synergistic breaker composition, comprising: a controlled degradable acid generating material, and an oxidizing component; introducing the treatment fluid into a formation; allowing the synergistic breaker composition to substantially reduce the viscosity of the treatment fluid.

A method of treating a formation according to certain embodiments may include providing a synergistic breaker composition, comprising: a controlled degradable acid generating material; and an oxidizing component; providing a treatment fluid comprising a base fluid and a gelling agent;

introducing the treatment fluid into a formation; and adding to the treatment fluid a synergistic breaker composition; and allowing the synergistic breaker composition to interact with the treatment fluid to substantially reduce the viscosity of the treatment fluid.

To facilitate a better understanding of the present disclosure, the following examples of certain aspects of some embodiments are given. In no way should the following examples be read to limit, or define, the scope of the disclosure.

EXAMPLE 1

Figure 1:
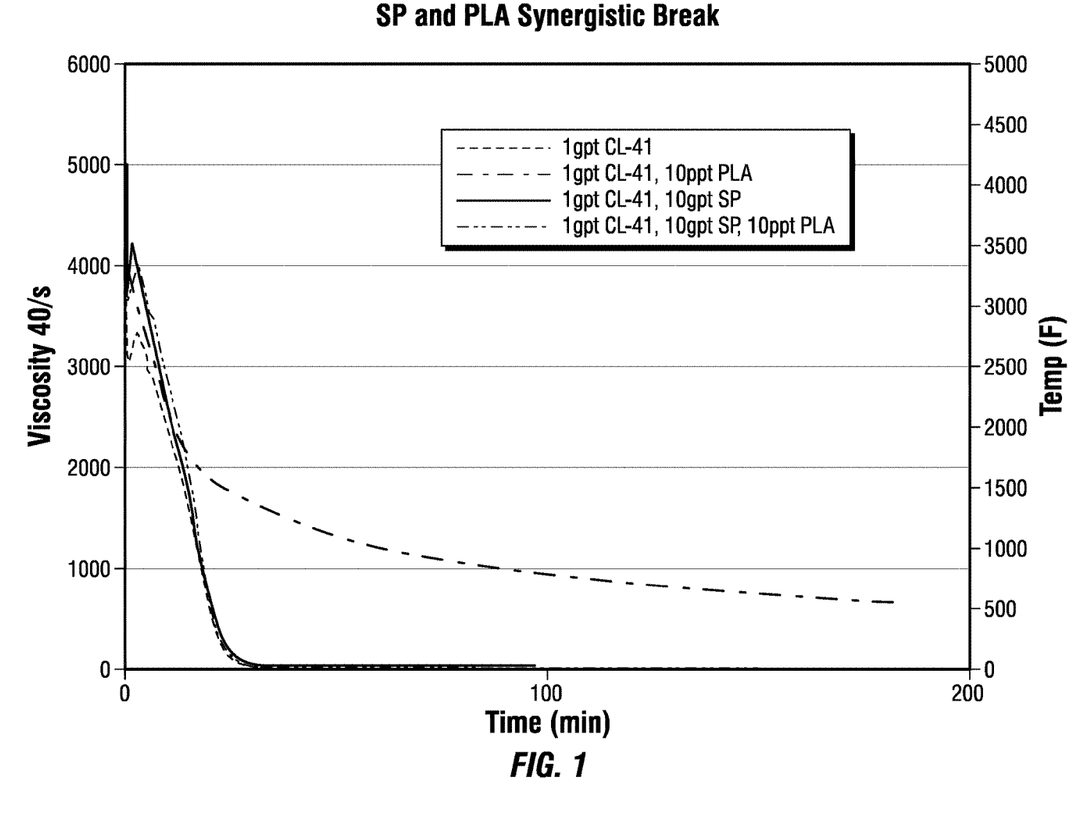
FIG. 1 illustrates an example Rheology curve of a fracturing fluid treated with various breaking substances, incorporating aspects of the present disclosure.

FIG. 1 shows example rheology curves obtained from viscometry measurement control tests. The viscosity of CMHEC was measured over time using a Chandler 5550 as the CMHEC was treated with one of four breaking fluid mixtures: CL-41 fluid with no added breaker, CL-41 and PLA mixture, CL-41 and SP mixture, and CL-41-SP-PLA mixture. The CL-41 fluid containing no breaker, CL-41 and SP mixture, and CL-41-SP-PLA mixture demonstrate similar viscosity break profiles while fluid with only PLA demonstrates a slower and incomplete break of the CMHEC.

Figure 2A:
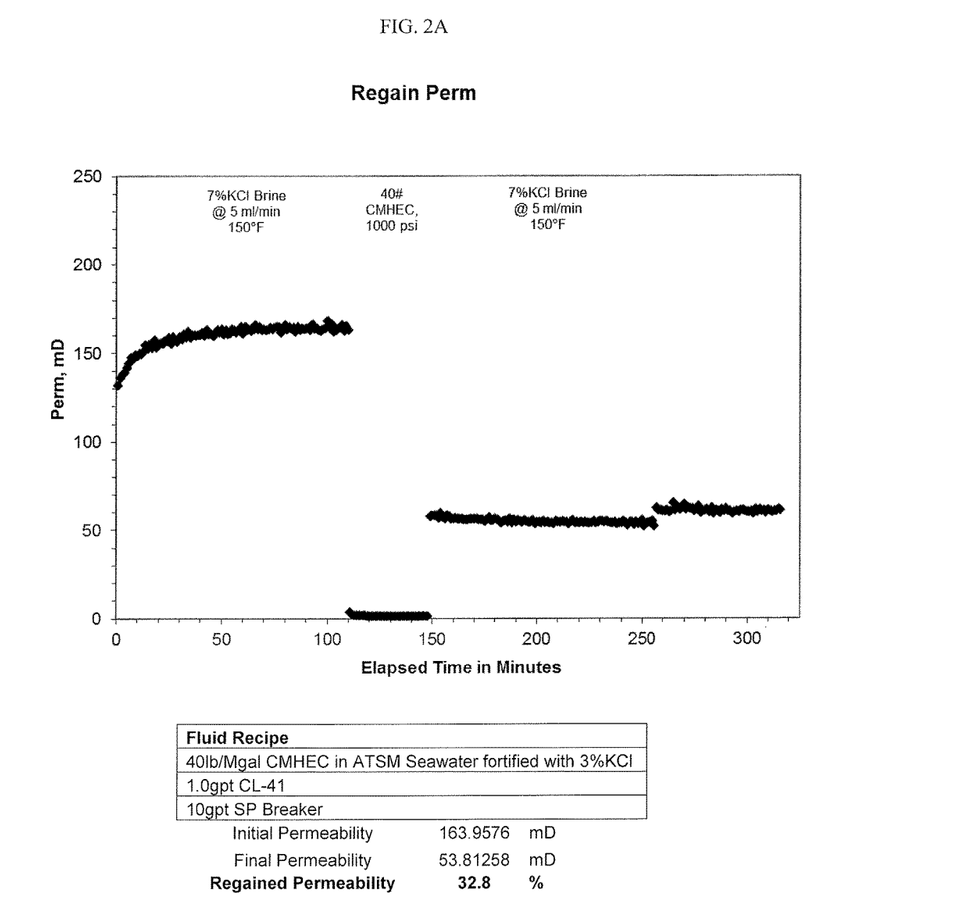
FIG. 2A illustrates regained permeability of a formation treated with only sodium persulfate breaker in seawater, incorporating aspects of the present disclosure.
Figure 2B:
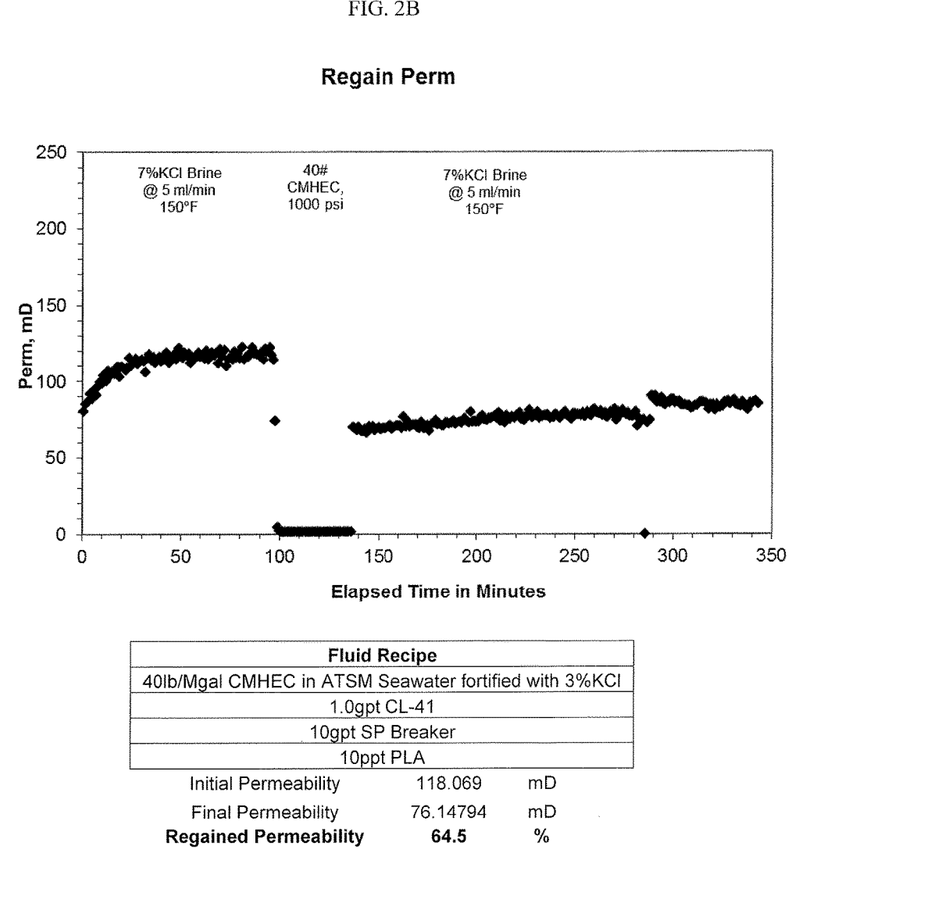
FIG. 2B illustrates regained permeability of a formation treated with both polylactic acid and sodium persulfate breaker in seawater, incorporating aspects of the present disclosure.
Figure 2C:
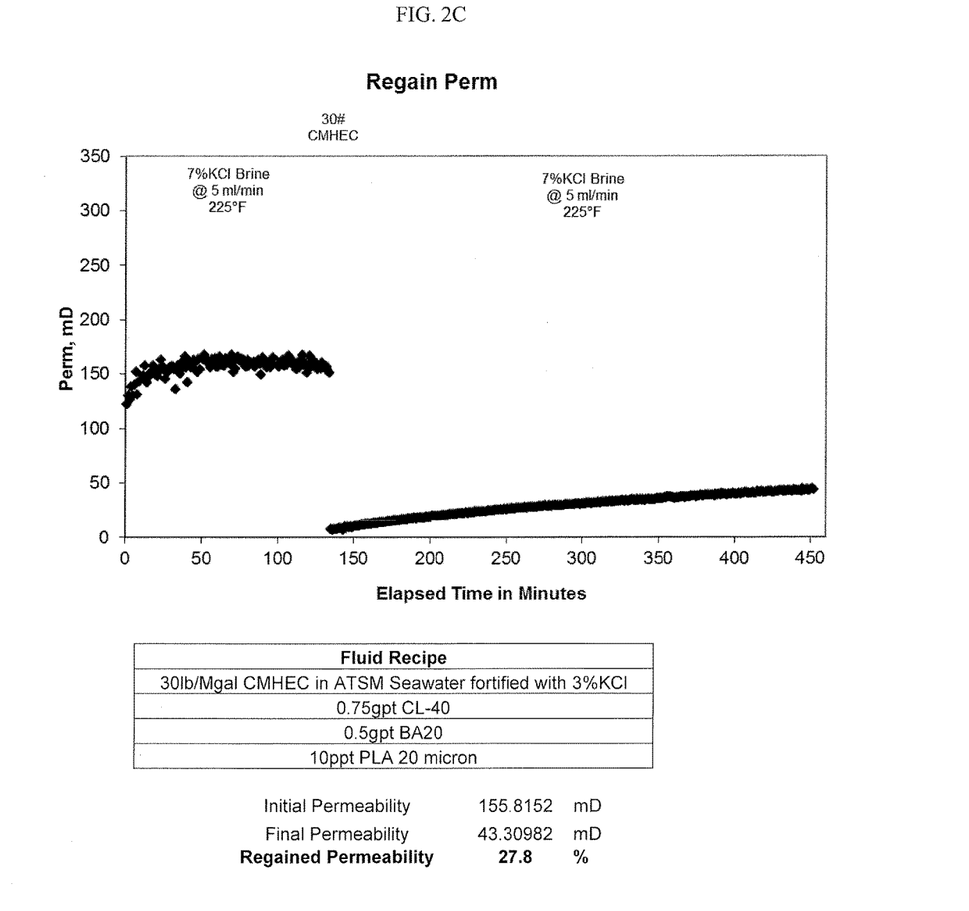
FIG. 2C illustrates regained permeability of a formation treated with polylactic acid in the presence of a buffer agent in seawater, incorporating aspects of the present disclosure.
Figure 2D:
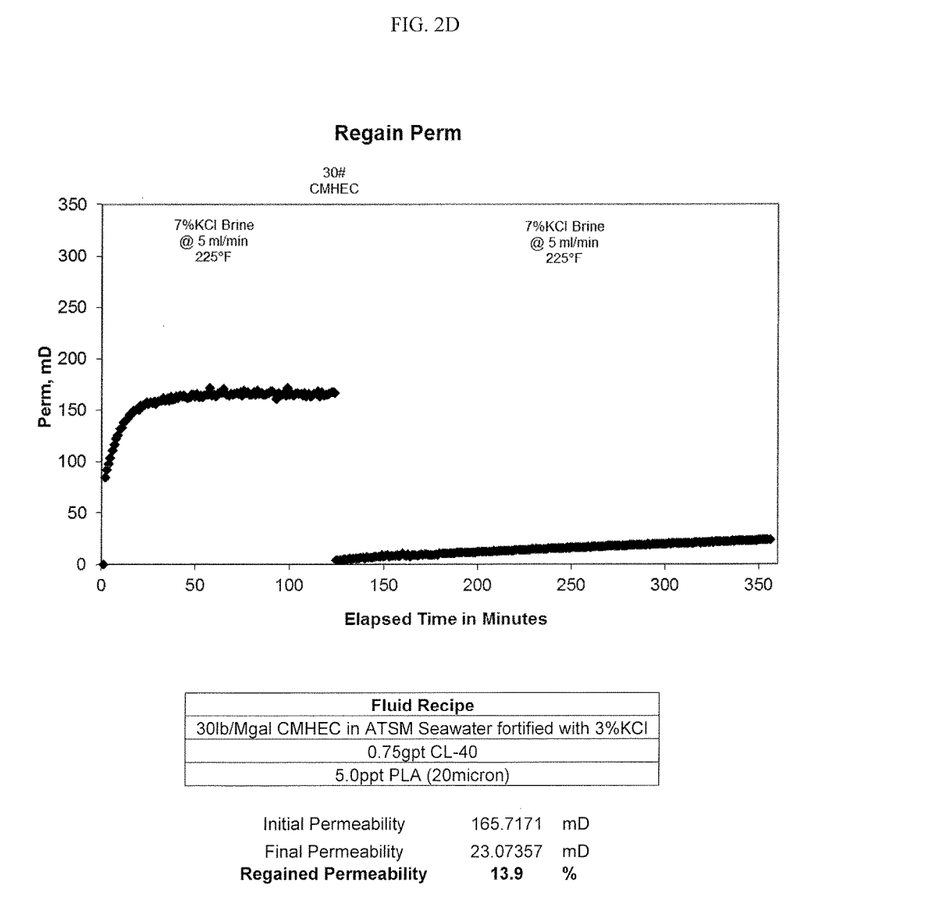
FIG. 2D illustrates regained permeability of a formation treated with polylactic acid in seawater, incorporating aspects of the present disclosure.

Despite the similar breaking profiles of the CL-41 and SP mixture and the CL-41-SP-PLA mixture, use of each fluid results in different clean up effectiveness during regain permeability testing, as shown in FIGS. 2A and 2B. In addition, FIGS. 2C and 2D show regain permeability results after treatment with PLA without SP. FIGS. 2A-2D show the results of regain permeability tests through similar Berea sandstone cores after 48 hour shut-in periods. Each regain permeability test is designed to simulate the effect of treatment of a post-fractured well. In each test, the initial permeability of the core was measured using a 7% KCl brine solution with a pressure of 5 ml/min. This initial permeability was then set to 100% permeability for the tested core. Next, the core was exposed to CMHEC at 1000 psi to simulate a fracturing operation. The CMHEC crosslinked fluid was then broken in the presence of SP, SP and PLA, or PLA, in the respective tests. Finally, the permeability of the core after CMHEC was measured, again using a 7% KCl brine solution under the same conditions as used to determine the initial permeability.

The final permeability was then compared to the initial permeability to obtain a regained permeability percentage. FIG. 2A shows a plot of permeability over time for a regain experiment using a salt-fortified seawater, 1 gpt CL-41, and 10 gpt SP breaker mixture. Following exposure of CMHEC and treatment with the SP only breaker mixture, the core demonstrated a regained permeability of 32.8% when compared to the initial permeability. FIG. 2B shows a plot of permeability over time for a regain experiment using a salt-fortified seawater, 1 gpt CL-41, 10 gpt SP, and 10 ppt PLA breaker mixture. After treatment with the SP and PLA breaker mixture, the core demonstrated a regained permeability of 64.5% when compared to the initial permeability. FIG. 2C shows a plot of permeability over time for a regain experiment using a salt-fortified seawater, 0.75 gpt CL-40, 0.5 gpt BA-20 buffering agent, and 10 ppt PLA breaker mixture. Following exposure of CMHEC and treatment with the PLA mixture, the core demonstrated a regained permeability of 27.8% when compared to the initial permeability. FIG. 2D shows a plot of permeability over time for a regain experiment using a salt-fortified seawater, 0.75 gpt CL-40, and 5 ppt PLA breaker mixture. Following exposure of CMHEC and treatment with the PLA mixture, the core demonstrated a regained permeability of 13.9% when compared to the initial permeability.

A method according to certain embodiments may include introducing the treatment fluid into the formation by any means known in the art. In certain embodiments, the treatment fluid may be introduced into the formation by pumping the treatment fluid into a well bore that penetrates a zone of the formation. In certain embodiments, the step of introducing comprises introducing under conditions for fracturing a treatment zone, at a rate and pressure that are at least sufficient to fracture the zone. In certain embodiments, the step of introducing is at a rate and pressure below the facture pressure of the treatment zone.

A method according to certain embodiments may include forming a crosslinked gel in the formation and subsequently introducing a treatment fluid into the zone, wherein the treatment fluid contains the synergistic breaker compound. The treatment fluid may operate to break the crosslinked gel and aid in cleaning up the crosslinked gel.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method comprising:
    providing a synergistic breaker composition, comprising:
        a controlled degradable acid generating material; and
        an oxidizing component;
    adding the synergistic breaker composition to a treatment fluid that comprises a base fluid and a metal crosslinked gelling agent that comprises a polymeric gelling agent that is crosslinked with a metal ion selected from the group consisting of a zirconium IV ion, a titanium IV ion, an aluminum ion, an antimony ion, a chromium ion, an iron ion, a copper ion, a zinc ion, and any combination thereof;
    introducing the treatment fluid into a formation; and
    allowing the synergistic breaker composition to (a) break crosslinks of at least a portion of the metal crosslinked gelling agent, and (b) break a polymer molecule from at least a portion of the polymeric gelling agent, wherein the viscosity of the treatment fluid is substantially reduced by (a) and (b).

2. The method of claim 1, wherein the base fluid is an aqueous base fluid.

3. The method of claim 1, wherein the oxidizing component has a concentration from 0.1 to 4 parts per thousand.

4. The method of claim 1, wherein the controlled degradable acid generating material has a concentration from 1 to 10 parts per thousand.

5. The method of claim 1, wherein the metal crosslinked gelling agent is a metal crosslinked carboxymethylhydroxyethyl cellulose.

6. A method of treating a formation, comprising:
providing a synergistic breaker composition, comprising:
a controlled degradable acid generating material; and
an oxidizing component;
providing a treatment fluid comprising a base fluid and a metal crosslinked gelling agent that comprises a polymeric gelling agent and wherein the metal crosslinked gelling agent is crosslinked with a metal ion selected from the group consisting of a zirconium IV ion, a titanium IV ion, an aluminum ion, an antimony ion, a chromium ion, an iron ion, a copper ion, a zinc ion, and any combination thereof;
introducing the treatment fluid into a formation;
adding to the treatment fluid the synergistic breaker composition; and
allowing the synergistic breaker composition to interact with the treatment fluid to (a) break crosslinks of at least a portion of the metal crosslinked gelling agent, and (b) break a polymer molecule from at least a portion of the polymeric gelling agent, thereby substantially reducing the viscosity of the treatment fluid.

7. The method of claim 6, further comprising recovering the treatment fluid from the formation.

8. The method of claim 7, wherein the formation has a permeability of between about 10 μD to 20 D after recovering the treatment fluid from the formation.

9. The method of claim 7, wherein the formation has a permeability of between about 100 mD to 2 D after recovering the treatment fluid from the formation.

10. The method of claim 1 wherein the controlled degradable acid generating material comprises at least one polymeric component selected from the group consisting of: polylactic acid (PLA), poly(ortho esters); aliphatic polyesters; poly(lactides); poly(glycolides); poly(s-caprolactones); poly(hydroxybutyrates); poly(anhydrides); poly(amino acids); copolymers; any combination thereof; and any derivative thereof.

11. The method of claim 6 wherein the controlled degradable acid generating material comprises at least one polymeric component selected from the group consisting of: polylactic acid (PLA), poly(ortho esters); aliphatic polyesters; poly(lactides); poly(glycolides); poly(s-caprolactones); poly(hydroxybutyrates); poly(anhydrides); poly(amino acids); copolymers; any combination thereof; and any derivative thereof.

12. The method of claim 1 wherein the metal ion is a zirconium IV ion or an aluminum ion.

13. The method of claim 6 wherein the metal ion is a zirconium IV ion or an aluminum ion.

14. The method of claim 7 wherein:
the base fluid is an aqueous base fluid;
the metal crosslinked gelling agent comprises a metal crosslinked carboxymethylhydroxyethyl cellulose;
the controlled degradable acid generating material comprises polylactic acid and has a concentration from 1 to 10 parts per thousand;
the oxidizing component comprises sodium persulfate and has a concentration from 0.1 to 4 parts per thousand; and
after the step of recovering the treatment fluid from the formation, the formation has a permeability of between about 100 mD to 2 D.

* * * * *